(12) United States Patent
Guntupalli

(10) Patent No.: US 12,469,018 B2
(45) Date of Patent: Nov. 11, 2025

(54) SPLIT ATM BOOTH AND METHOD OF PERFORMING BANKING TRANSACTIONS THEREIN

(71) Applicant: Digital First Holdings LLC, Atlanta, GA (US)

(72) Inventor: Vishwam Guntupalli, Hyderabad (IN)

(73) Assignee: Digital First Holdings LLC, Atlanta, GA (US)

( * ) Notice: Subject to any disclaimer, the term of this patent is extended or adjusted under 35 U.S.C. 154(b) by 0 days.

(21) Appl. No.: 14/169,756

(22) Filed: Jan. 31, 2014

(65) Prior Publication Data
US 2016/0019510 A1 Jan. 21, 2016

(51) Int. Cl.
| | | |
|---|---|---|
| G06Q 20/10 | (2012.01) | |
| G06Q 20/32 | (2012.01) | |
| G06Q 20/40 | (2012.01) | |
| G06Q 40/02 | (2023.01) | |

(52) U.S. Cl.
CPC ..... *G06Q 20/1085* (2013.01); *G06Q 20/3274* (2013.01); *G06Q 20/40* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 4,813,475 A | * | 3/1989 | Couvrette | G05D 23/1919 109/2 |
| 4,835,983 A | * | 6/1989 | Chandler, Jr. | F24F 1/022 454/185 |
| 5,139,384 A | * | 8/1992 | Tuttobene | G07F 7/069 221/88 |
| 5,220,157 A | * | 6/1993 | Martin | G07F 19/20 235/375 |
| 5,526,615 A | * | 6/1996 | Kaizu | G07F 19/205 49/40 |

(Continued)

OTHER PUBLICATIONS

Automated+teller+machine—Google Search. Automated+teller+machine—Google Search. N.p., n.d. Web. Aug. 16, 2016. <https://www.google.com/search?q=automated%2Bteller%2Bmachine&biw=1371&bih=704&source=lnt&tbs=cdr%3A1%2Ccd_min%3A%2Ccd_max%3A3%2F17%2F2013&tbm=>.*

(Continued)

*Primary Examiner* — Matthew S Gart
*Assistant Examiner* — Irene S Kang
(74) *Attorney, Agent, or Firm* — Schwegman Lundberg & Woessner, P.A.

(57) ABSTRACT

The present invention discloses a split ATM booth and method of providing instant banking transactions. The split ATM booth includes teller kiosks for receiving a transaction request, sending a pre-stage transaction authorization request to an ATM network server, printing a transaction receipt containing a unique transaction encryption code. Cash dispenser terminals are provided for scanning the unique transaction encryption code, sending a transaction authorization request to the ATM network server, receiving a transaction approval from the ATM network server upon verification of the user account details and transaction details, executing the transaction and printing a transaction receipt. A transaction network switch controls the banking transactions at the split ATM booth.

5 Claims, 5 Drawing Sheets

(56) References Cited

U.S. PATENT DOCUMENTS

| | | | | |
|---|---|---|---|---|
| 6,386,323 | B1* | 5/2002 | Ramachandran | G07F 19/203 |
| | | | | 705/16 |
| 8,608,057 | B1* | 12/2013 | Crews | G06F 21/57 |
| | | | | 235/379 |
| 9,552,465 | B2* | 1/2017 | Pike | G06F 21/62 |
| 2003/0191722 | A1* | 10/2003 | Thompson | G06Q 20/367 |
| | | | | 705/66 |
| 2004/0169722 | A1* | 9/2004 | Pena | G06Q 40/02 |
| | | | | 348/14.08 |
| 2006/0271496 | A1* | 11/2006 | Balasubramanian | G06Q 20/04 |
| | | | | 705/64 |
| 2007/0203835 | A1* | 8/2007 | Cai | G06Q 20/1085 |
| | | | | 705/43 |
| 2011/0238573 | A1* | 9/2011 | Varadarajan | G06Q 20/1085 |
| | | | | 705/43 |
| 2012/0239579 | A1* | 9/2012 | Wolfs | G06Q 20/18 |
| | | | | 705/72 |
| 2013/0159186 | A1* | 6/2013 | Brudnicki | G06Q 20/385 |
| | | | | 705/44 |

OTHER PUBLICATIONS www.merriam-webster.com/dictionary, Dec. 21, 2016, via Wayback Machine (Year: 2016).*
https://www.merriam-webster.com/dictionary/phone via Wayback Machine on Nov. 6, 2012 (Year: 2012).*
Ryan, Philip, "JPMorgan Chase Steps Up Installation of Self-Service Kiosks and Card-Issuing Machines in Branches", Bank Automation News, https://www.hspci.com/irt.php via Wayback Machine (Year: 2012).*

\* cited by examiner

SPLIT ATM BOOTH AND METHOD OF PERFORMING BANKING TRANSACTIONS THEREIN

FIELD OF THE INVENTION

The present invention generally relates to Automated Teller Machines (ATMs). In particular, the invention relates to split ATMs wherein the teller kiosks and cash acceptor or dispenser terminals are built separately and placed in different locations.

BACKGROUND OF THE INVENTION

Presently ATM terminals are used by the banks and financial institutions to facilitate instant banking transactions. For example, these instant banking transactions may include cash dispensing, cash depositing, transfer of funds, making payments, generation of accounts statement, balance enquiry, change of pin and so forth.

The instant banking transactions offered by the ATM terminals fall under two categories based on the nature of the transactions. The first type of transactions relates to cash transactions with the use of cash acceptor/depositor terminals. The second type of transactions relates to accounts transactions without the use of cash acceptor/depositor terminals. The examples of the cash related transactions may include cash deposit, cheque deposit, cash withdrawal and so forth. The accounts related transactions may include balance enquiry, generation of mini statement, making payments, printing statements, transfer of funds and so forth. It has been observed that the accounts related transactions require less time and may be finished quickly. However, at the conventional ATM terminals people make a single queue for both types of transactions. Consequently it causes more delay in queue time for both type of transactions.

Further it has been observed that total acquisition cost of a single ATM terminal is quite high. The acquisition cost may include rent for the ATM booth, cost of hardware, software and so forth. In addition, the ATM terminals typically require high maintenance cost. For example, the maintenance cost may include cost of cooling, cost of power consumption, cost of statement printing, cost of security person's salary and so forth. Apart from the afore-mentioned costs, some banks and financial institutions spend on advertising and other value added features in their ATM terminals to draw incremental revenue and differentiate their ATM terminals from others.

In view of above discussion, it may be understood that there exists a need to provide an improved ATM terminal which is cost effective and reduces queue time.

SUMMARY OF THE INVENTION

The main object of the present invention is to provide a split ATM booth, which includes separate terminals for teller operation and cash dispenser/acceptor operation.

Another object of the present invention is to provide a split ATM booth, which reduces the operating cost significantly and thereby reduces the cost of ownership.

Another object of the present invention is to provide a split ATM booth, which reduces waiting time in queue for the transactions.

Another object of the present invention is to provide a split ATM booth, which reduces space requirement of the ATM terminals.

Another object of the present invention is to provide a split ATM booth, which includes multiple ATM terminals for multiple banks so as to increase their reach to customers, and share costs.

Another object of the present invention is to provide a split ATM booth, which increases level of security of banking transactions at the ATM terminals.

In order to meet the above mentioned requirements, the present invention discloses a split Automated Teller Machine (ATM) booth for providing instant banking transactions. The split ATM booth includes plurality of teller kiosks for offering account related transactions, each of the plurality of teller terminals includes a card reader for receiving a customer account information, a display unit for showing a transaction information, an embedded mother board connected to an ATM network server for executing the transactions, a printer for printing a receipt of the transaction. The split ATM booth also includes one or more cash dispenser terminals connected to the ATM network server for offering cash related transactions and a transaction network switch coupled with the ATM network server for controlling the transactions.

In an embodiment, the display units of the teller kiosks may include a touch screen panel for receiving customer inputs required for the transaction.

In another embodiment, the teller kiosks include a key pad for receiving customer inputs required for the transaction.

In another embodiment, the teller kiosks may be installed on one or more outer walls of the split ATM booth.

In another embodiment, the cash dispenser terminals may be installed inside the split ATM booth, the split ATM booth is configured to provide required cooling to the cash dispenser terminals.

In another embodiment, the teller kiosks may include IVR terminal for offering the transactions by voice calling.

In one aspect of the present invention, a method of performing an account related banking transaction in a split ATM booth is disclosed. The method includes steps of receiving a transaction request including user account information and the transaction information at a teller kiosk, sending a transaction authorization request to a transaction network switch, receiving transaction approval from the transaction network switch upon verification of the user account information and the transaction information and printing a transaction receipt by the teller kiosk. The account related banking transaction may include balance enquiry, transfer of funds, making payments, printing statements.

In another aspect of the present invention, a method of performing a cash related banking transaction in a split ATM booth is disclosed. The method includes the steps of receiving a transaction request including user account information and the transaction information at a teller kiosk, sending a pre-stage transaction authorization request to a ATM network server, printing a transaction receipt containing a unique transaction encryption code by the teller kiosk, scanning the unique transaction encryption code at a cash dispenser terminal, sending a transaction authorization request to the ATM network server by the cash dispenser terminal, receiving a transaction approval from the ATM network server upon verification of the user account details and transaction details, dispensing cash from the cash dispenser terminal and printing a transaction receipt by the cash dispenser terminal.

In one embodiment, a cash related banking transaction includes accepting cash or cheque at the cash dispensing terminal.

In another embodiment, the method of performing a cash related banking transaction in a split ATM booth includes generating a transaction receipt containing a unique transaction encryption code by online transaction from a computer system or a mobile device.

Further, the unique transaction encryption code may be a bar code, a QR code, and a One Time Password (OTP).

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and other advantages of the invention will be better understood and will become more apparent by referring to the exemplary embodiments of the invention, as illustrated in the accompanying drawings, wherein FIG. 1 schematically illustrates system topology of a split ATM booth according to one embodiment of the present invention.

DETAILED DESCRIPTION OF THE INVENTION

Reference will now be made to the exemplary embodiments of the invention, as illustrated in the accompanying drawings. Where ever possible same numerals will be used to refer to the same or like parts.

Figure 1:
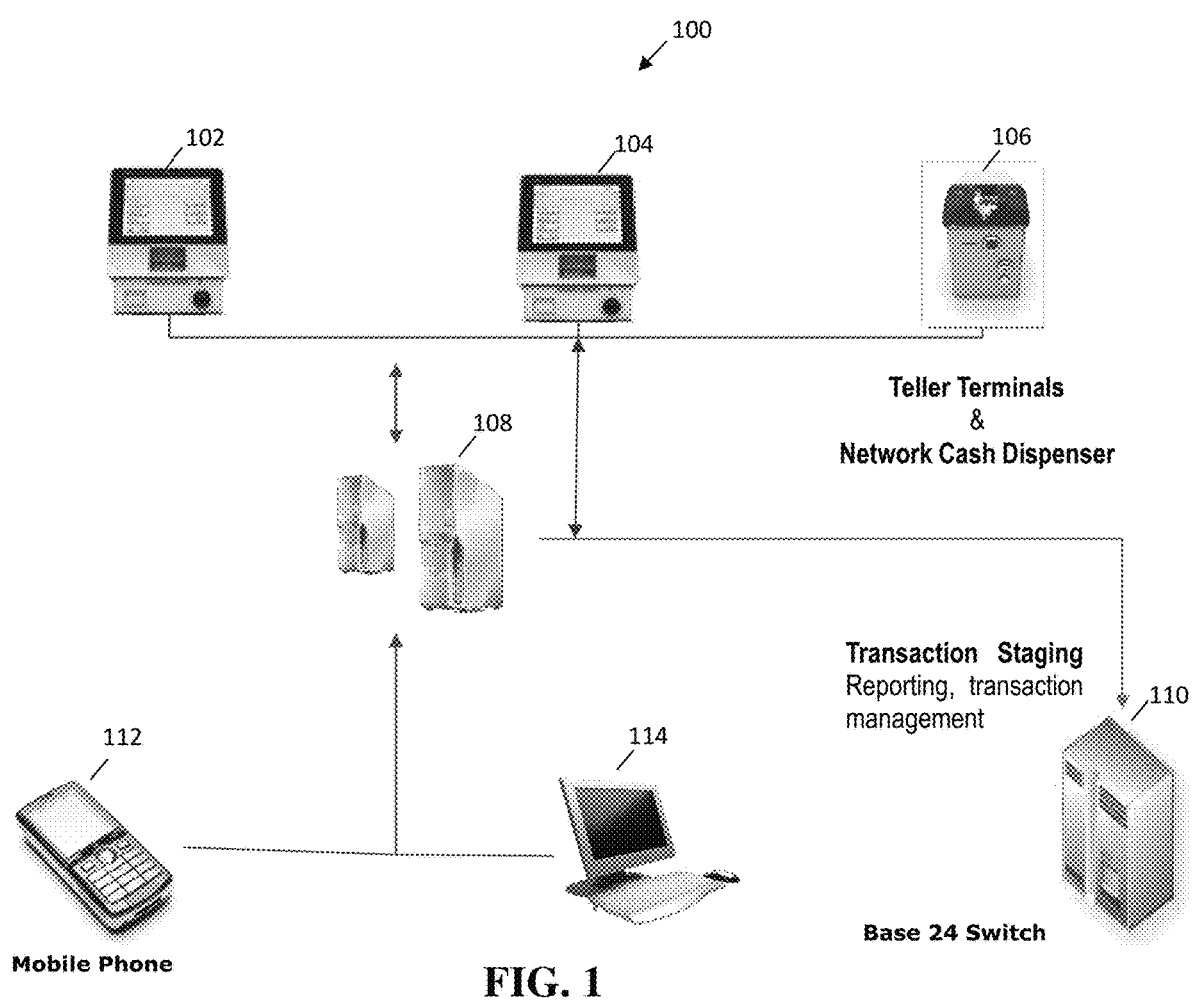

Disclosed herein is a split ATM terminal and a method of performing banking transactions at the ATM terminal. The split ATM terminal may include a separate teller kiosk terminal and a network enabled cash dispenser/acceptor terminal. In another embodiment, the split ATM may include plurality of teller kiosks and plurality of cash acceptors/dispenser terminals. FIG. 1 schematically illustrates system topology of such split ATM 100 according to one embodiment of the present invention. FIG. 1 shows the split ATM 100 includes plurality of teller terminals 102, 104, cash dispenser/acceptor 106, and transaction switches 108, 110. The banking transaction may be performed manually or by wireless communication channels through a mobile phone 112, and personal computer 114.

The teller terminals 102, 104 may be kiosks including embedded mother board, E-ink display, card reader, an Encrypted PIN Pad (EPP) and receipt printer. The teller terminals 102, 104 may include keyboard and touch screen display for receiving inputs required for the transaction. Optionally the teller kiosks may include a non-touch screen with functional display keys. In one embodiment, the card reader may be a dip card reader. The teller terminals 102, 104 may be used for the accounts related transactions. These transactions may include and not limited to balance enquiry, transfer of funds, making payments, printing statements, pre-stage cash withdrawal, pre-stage cash deposit, pre-stage cheque deposit and so forth.

The cash acceptors/dispensers 106 may be connected to a network through the transaction switch 108. In order to complete the cash related transactions, the transaction switch may validate the pre-stage cash withdrawal, pre-stage cash deposit, and pre-stage cheque deposit and the cash acceptor/dispenser terminal 106 dispenses or accepts the cash or cheques.

Figure 2:
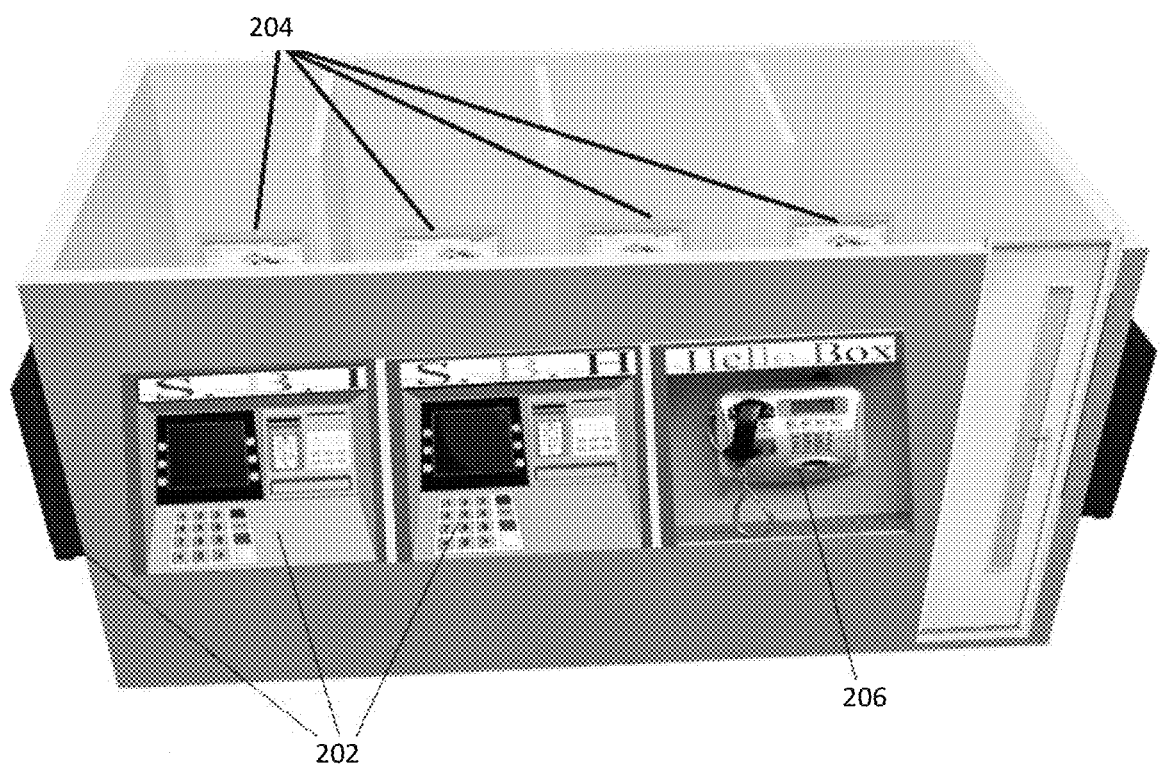
FIGS. 2 and 3 schematically illustrates perspective views of a split ATM booth according to one embodiment of the present invention.
Figure 3:
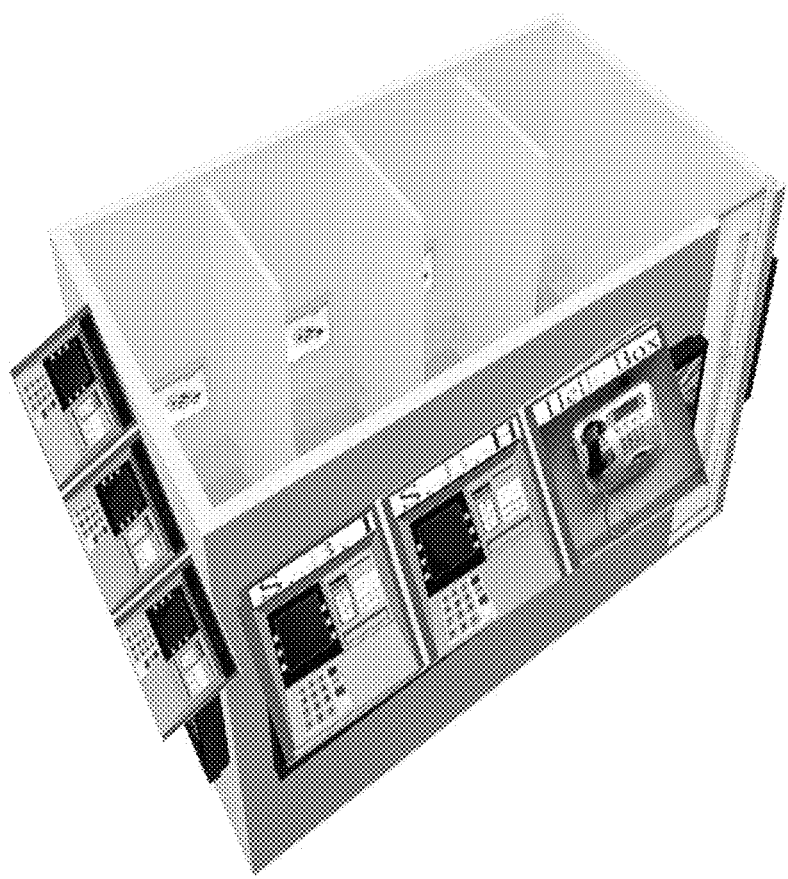

FIG. 2 and FIG. 3 illustrate such a split ATM system according to another embodiment, wherein multiple teller terminals 202 are built into outer walls of a split ATM booth. The split ATM also may include multiple cash dispenser/acceptor terminals 204 placed inside the walled room of the split ATM booth. Generally the cash dispensers/acceptors and the network switches require cooling for proper operation. Air conditioning may be used for providing such cooling inside the room of the split ATM booth. The teller terminals generally do not require cooling and may be placed on the outer walls of the split ATM booth. The teller terminals may be placed on one or all the outer walls in any orientation based on the user requirements. In an exemplary embodiment, the teller terminals may be positioned horizontally adjacent to one another. A separation wall also may be provided between such multiple teller terminals to maintain privacy of the transactions. In another embodiment, the dispenser terminals may be installed in bank branches where the teller in the bank may provide the consumer with a receipt containing an encrypted bar code of OTP.

In another embodiment, at least one teller terminal may include a display device with a telephone or voice phone 206. In another embodiment, all the teller terminals may have the capability to provide voice guidance in one or more languages. When the consumer picks up the phone, the telephone of the teller terminal may connect to call centre of the bank and a customer executive may provide required service for the consumer. Such telephone teller terminals may facilitate the visually challenged consumers to perform banking transactions through ATM terminals. The IVR terminals may have a receipt printer that prints the OTP or encrypted Barcode or QR code.

Figure 4:
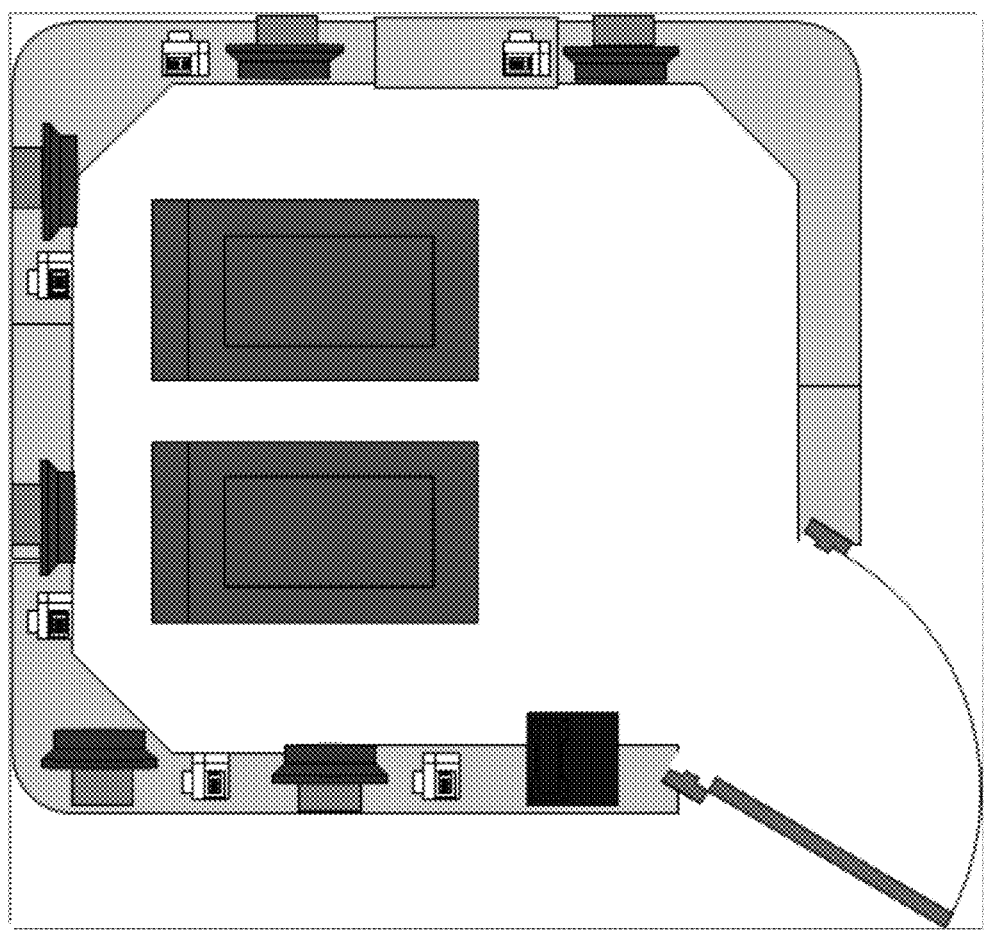
FIG. 4 illustrates top view of a split ATM booth according to one embodiment of the present invention.

FIG. 4 illustrates a top view of such split ATM booth. In one advantage the present invention optimizes the space requirement of such split ATM. For example, a 4'×4' space is adequate to provide multiple teller terminals and multiple cash acceptor/dispenser terminals. In another advantage, the power requirement of such structure is also minimized by placing the teller terminals on the outer walls and reducing the cooling facility for the teller terminals. Consequently it provides low cost of maintenance to such split ATM with multiple teller terminals.

Figure 5:
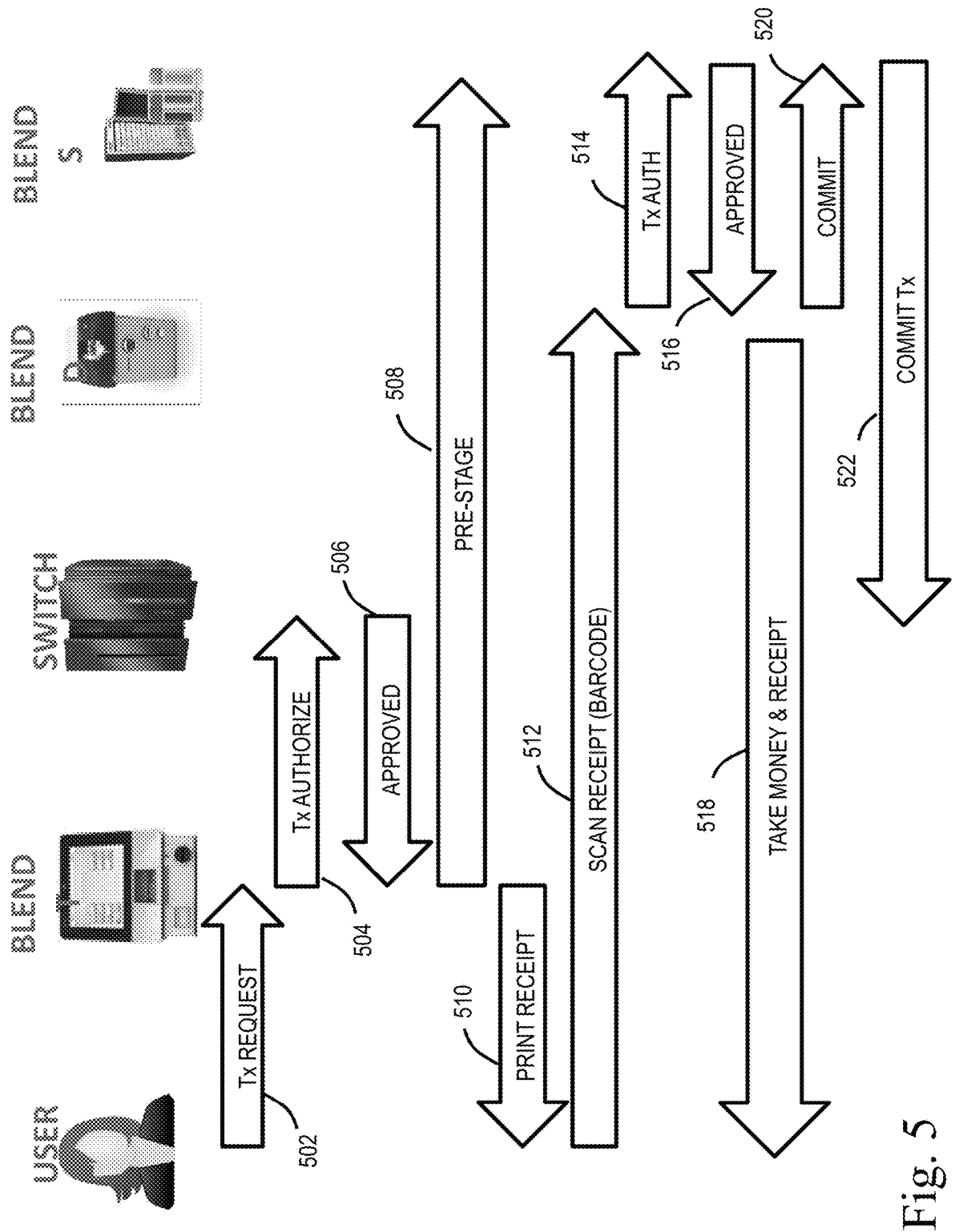
FIG. 5 is a flow diagram illustrating a method of performing transactions in a split ATM booth according to one embodiment of the present invention.

FIG. 5 is a flow diagram which illustrates method of performing transactions on such split ATM according to one embodiment of the present invention. For accounts related transactions the full transactions may be completed only on the teller terminals. Initially at 502 a user may initiate an accounts related transaction on a teller terminal. Next the teller terminal may send the transaction request to the transaction switch at 504. Upon receiving the request for transaction and checking the user identification details such as unique debit card number, unique ATM card number, unique pin code and so forth, the transaction switch may approve the transaction at 506. In case the transaction is related to pre-stage cash withdrawal, pre-stage cash deposit and pre-stage cheque deposit, the teller terminal receives a unique transaction encryption code from the ATM server at 508. The unique transaction encryption code may be generated based on the unique user identification information and the transaction request. For example, the unique transaction code may be a barcode, QR code, One Time Password (OTP) and so forth. In one embodiment such unique transaction encryption codes may be transmitted to user mobile device or user computer system. Next, a receipt of the transaction is printed and given to the user at 510. For the pre-stage transactions the receipt may include the printed unique transaction identification code.

For the cash related transactions, the receipt including the unique transaction encryption code is scanned at the cash acceptor/dispenser terminal (shown at 512). Next, the unique transaction code is sent to the ATM server for approval at 514. Based on the valid information the ATM server approves the requested transaction as shown at 516. After receiving approval, the transaction commit request is sent by the cash acceptor/dispenser terminal to the ATM server at 520. The requested transaction is committed by the ATM server with the help of transaction switch at step 522. Finally cash is dispensed at the cash dispenser terminal at 518 and printed receipt of the transaction is provided to the user. For deposit of cash/cheque, the cash or the cheque is accepted by the cash/cheque acceptor terminal and receipt of the transaction is printed to the user.

The present invention reduces the space requirements for the ATMs. Further, multiple banks may have teller kiosks in a single ATM booth thereby optimizing the space requirements. It also reduces power requirements as only the dispenser terminals are cooled. The present invention does not replace the existing switches, therefore the cost of upgrade to the present system is less. The preset invention also may be combined with mobile cash dispenser terminals for the remote areas. Further, it also increases one level of security because of use of encrypted transaction code at the dispenser terminals.

It is to be understood by a person of ordinary skill in the art that various modifications and variations may be made without departing from the scope and spirit of the present invention. Therefore, it is intended that the present invention covers such modifications and variations provided they come within the ambit of the appended claims and their equivalents.

What is claimed is:

1. A system, comprising:
    (i) a teller kiosk for offering account related transactions, comprising:
        a card reader for receiving a customer account information;
        a display unit for showing a transaction information;
        an embedded mother board connected to an ATM network server to execute the transactions and provide a unique transaction code for each transaction,
            wherein each unique transaction code is encrypted based on a corresponding customer identifier for a particular customer of a particular transaction and based on a corresponding transaction identifier for the particular transaction;
            wherein each unique transaction code represents a One Time Password (OTP) to complete the particular transaction;
            wherein each unique transaction code is transmitted to a particular mobile device operated by the particular customer associated with the particular transaction;
            wherein each unique transaction code is encrypted and is provided to the particular mobile device as an encrypted bar code representing a corresponding OTP; and
        a printer to print receipts for the transactions;
            wherein each receipt includes the encrypted bar code of the corresponding OTP for a corresponding unique transaction code of a corresponding transaction and a corresponding;
        an Encrypted PIN Pad (EPP) to input Personal Identification Numbers (PINs) before the PINs are processed for the transactions;
        an interactive voice response (IVR) terminal configured to provide voice guidance to the particular customer in one or more languages;
            wherein the teller kiosk is configured to provide voice guidance during the particular transaction to the particular customer;
            wherein the IVR terminal comprises the printer;
    (ii) at least one wall physically separating the teller kiosk from cash dispenser terminals;
    (iii) a separation wall between each cash dispenser terminal to maintain privacy during the transactions;
        wherein the teller kiosk is built into an outer wall of the system and each cash dispenser terminal is placed inside a walled room of the system; and
    (iv) the cash dispenser terminals connected to the ATM network server to provide cash related transactions;
        wherein each of the cash dispenser terminals are physically separated from the teller kiosk by at least one wall;
        wherein the cash dispenser terminals are configured to communicate with the teller kiosk through a transaction network switch over a network;
        wherein each cash dispenser terminal is configured to:
            receive as input the encrypted bar codes of corresponding OTPs;
            authorize the unique transaction codes represented in the encrypted bar codes of the OTPs over the ATM network server; and
            dispense cash or accept cash or checks as a particular deposit in accordance with a specific transaction linked to a particular unique transaction code provided as the input via a corresponding encrypted bar code of the corresponding OTP; and
    wherein the transaction network switch is coupled with the ATM network server and is configured to control the transactions and to validate:
    wherein the teller kiosk processes pre-staged cash withdrawals and pre-staged deposits with the pre-staged cash withdrawals represented in the unique transaction codes via the encrypted bar codes of the OTPs on the receipts;
    wherein each cash dispensing terminal validates cash dispensing, cash depositing, and check depositing;
    wherein the teller kiosk optimizes space requirements by providing multiple teller terminals and multiple cash acceptor/dispenser terminals within a 4'×4' space.

2. The system as claimed in claim 1, wherein the display unit of the teller kiosk comprises a touch screen panel for receiving customer inputs required for the transactions.

3. The system as claimed in claim 1, wherein the teller kiosk comprises a key pad for receiving customer inputs required for the transactions.

4. The system as claimed in claim 1, wherein the teller kiosk is installed on one or more outer walls.

5. The system as claimed in claim 1, wherein the teller kiosk comprises an IVR terminal for offering the transactions by voice calling.

\* \* \* \* \*

UNITED STATES PATENT AND TRADEMARK OFFICE
CERTIFICATE OF CORRECTION

PATENT NO. : 12,469,018 B2
APPLICATION NO. : 14/169756
DATED : November 11, 2025
INVENTOR(S) : Vishwam Guntupalli Page 1 of 1

It is certified that error appears in the above-identified patent and that said Letters Patent is hereby corrected as shown below:

On the Title Page

Item [30], insert:
--(30) Foreign Application Priority Data
Mar. 18, 2013 (IN) 1162CHE2013--

Signed and Sealed this
Third Day of February, 2026

John A. Squires
*Director of the United States Patent and Trademark Office*